(12) United States Patent
Ocke et al.

(10) Patent No.: US 8,848,214 B2
(45) Date of Patent: *Sep. 30, 2014

(54) SYSTEM AND METHOD FOR AUTOMATICALLY VALIDATING A WORKFLOW PLAN USING AN AUTOMATED PLANNER

(75) Inventors: Kirk J. Ocke, Ontario, NY (US); Rong Zhou, San Jose, CA (US); Minh B. Do, Palo Alto, CA (US); Dale Ellen Gaucas, Penfield, NY (US); Michael David Shepherd, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 1033 days.

This patent is subject to a terminal disclaimer.

(21) Appl. No.: 12/323,800

(22) Filed: Nov. 26, 2008

(65) Prior Publication Data

US 2010/0128304 A1    May 27, 2010

(51) Int. Cl.
*G06F 3/12* (2006.01)
*G06Q 10/00* (2012.01)
*G06Q 30/00* (2012.01)
*G06Q 10/06* (2012.01)

(52) U.S. Cl.
CPC .................................... *G06Q 10/06* (2013.01)
USPC ....... 358/1.15; 358/1.13; 705/7.27; 705/7.37; 705/26.1

(58) Field of Classification Search
None
See application file for complete search history.

(56) References Cited

U.S. PATENT DOCUMENTS

2006/0265201 A1* 11/2006 Martin ............................. 703/6
2008/0235691 A1*  9/2008 Anderson et al. ............. 718/102

* cited by examiner

*Primary Examiner* — Fan Zhang
(74) *Attorney, Agent, or Firm* — Luis M. Ortiz; Kermit D. Lopez; Tuesday A. Kaasch

(57) ABSTRACT

An improved automated planning method and system includes the use of an automated planner for validating a workflow plan with respect to device capabilities. As such, the present invention provides for an improved method and system for implementing and managing workflow plans utilized in printing environments such as, for example, print shops. A plurality of device capability descriptions can be converted into a data indicative of facts and operators for utilizing in a knowledge-based reasoning system. Next, a workflow plan can be converted into properties indicative of a goal state. The goal state and the data indicative of facts and operators can then be utilized in association with a domain-independent or domain-dependent planner to determine if said workflow plan is valid and executable in order to thereby validate said workflow plan.

12 Claims, 3 Drawing Sheets

SYSTEM AND METHOD FOR AUTOMATICALLY VALIDATING A WORKFLOW PLAN USING AN AUTOMATED PLANNER

TECHNICAL FIELD

Embodiments are generally related to automated planning methods and systems. Embodiments are also related to workflow plans utilized in printing environments, such as, for example, print shops. Embodiments additionally relate to techniques for automatically validating workflow plans utilized in printing environments. Embodiments are further related to techniques for converting device capability languages for use in an automated planning environment.

BACKGROUND OF THE INVENTION

Printing environments such as, for example, print shops require a variety of workflow plans in order to achieve maximum efficiency and output in producing and rendering documents, graphics, and so forth. A print shop can be a system wherein devices for formatting, printing, cutting, and binding are utilized to create a finished printed product such as a book or brochure. A "workflow plan" is essentially an ordered or partially ordered list of the actions needed to accomplish the desired finished product using the devices available.

When "lights out" workflow automation is desired in a print shop, the automated validation of a workflow plan against the capabilities of the devices and services of the print shop is necessary. Current device capability description languages describe what an individual device is capable of performing, but are not efficient in describing the relationships between individual devices (e.g., Imposition must come before Print for a printer that does not do on-board imposition), nor do they express adequately how the device will effect or alter the workflow plan. It should be noted that printing of books is performed by printing large sheets of paper which are formatted through a process called imposition, for later folding that will result in sequential pagination. One example of the inefficiency of current device capability description languages is when an imposition device that performs Booklet-Signature imposition, the imposition device may alter the input image size from, for example, 8.5×11 to 17×11. Such an effect is not often described by the capability description of the imposition device. For this reason, the current state of the art can only be effectively used to validate workflow plans for which every effect of each step in the workflow is known a priori at the start of workflow execution, which is not always realistic.

Additionally, many of the constraints and capabilities of a device are not often contained in a formal capability description file, but are instead only available from other sources (e.g., queue settings, implicit knowledge, etc.). There are also a variety of device capability description languages which can further complicate how individual devices communicate. Some languages, such as Xerox Capabilities (XCAP), describe or relate to the capabilities of a printer. Another common device capability description language is Job Definition Format (JDF) which describes the capabilities of a wide range of devices found in the print shop. All of these factors make it difficult to accurately validate a workflow plan in a print shop.

Workflow plans can be generated utilizing a number of different approaches. For example, workflow plans can be automatically generated using technology that converts a product description into a workflow plan. Workflow plans can also be manually created as part of the order entry process and planning process within a print shop. Finally, a workflow plan may be supplied by an external entity, such as when a print shop receives work that has been vended out from another print shop.

There are many device capability description languages used in the industry today. Based on the foregoing, it is believed that because the content of such prior device capability description languages is well defined, a more efficient and desirable approach could involve mechanical mapping to facts and operators in a rule-based system, or facts, predicates and operators in the context of an automated planning environment. It is also believed that such an automated planning environment could provide greater user flexibility by functioning to both validate and synthesize workflow plans where minimal details are provided by a user. A benefit of such a hybrid approach also gives users the impression that they are in control, reducing the initial technology resistance for early adopters. Such an approach is described in greater detail herein.

BRIEF SUMMARY

It is, therefore, one aspect of the present invention to provide for an improved automated planning method and system.

It is another aspect of the present invention to provide for an improved method and system for implementing and managing workflow plans utilized in printing environments such as, for example, print shops.

It is a further aspect of the present invention to provide for an improved method and system for automatically validating workflow plans utilized in print environments, wherein validation means that the workflow plan is executable, or a new workflow plan that is executable can be synthesized from the original workflow plan.

It is another aspect of the present invention to provide for an improved technique for converting device capability languages for use in an automated planning environment.

The aforementioned aspects and other objectives and advantages can now be achieved as described herein. A method and system are disclosed for automated validation of a workflow plan. A plurality of device capability descriptions can be converted into data indicative of facts and operators for utilization in a knowledge-based reasoning system. Next, a workflow plan can be converted into properties indicative of a goal state. The goal state and the data indicative of facts and operators can then be utilized in association with a domain-independent or domain-dependent planner to determine if said workflow plan is valid and executable in order to thereby validate said workflow plan.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

The disclosed embodiments disclose techniques for automatically converting a plurality of device capability descriptions into facts, predicates and/or operators in an automated planning system, along with an approach for converting a specific workflow plan into additional facts, predicates and operators, and the desired properties of a goal state, in the same automated planning system. Additional knowledge from sources beyond the device capability descriptions may also be encoded within the context of the automated planning system. This knowledge represents the relationships between devices and the effects of devices not captured in the device capability descriptions. The automated planning method and system can then be utilized to determine if the original workflow plan is capable of being executed or to synthesize a workflow plan that can be executed from the initial facts, by applying the operators, to arrive at a goal state with desired properties.

The disclosed embodiments can be as easily implemented utilizing a backwards chaining rule-based system as can be done using an automated planning system. For the sake of simplicity, however, the embodiments discussed herein focus primarily on an automated planning system.

Figure 1:
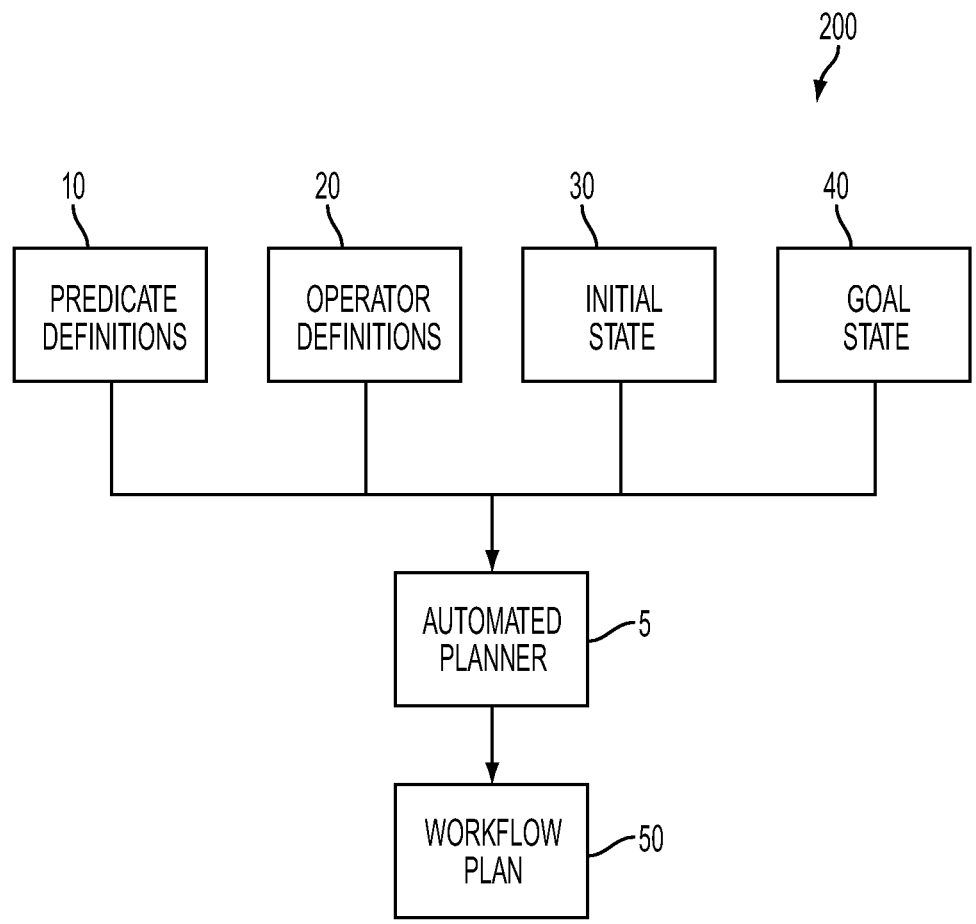
FIG. 1 illustrates an automated planning system that can be implemented in accordance with a preferred embodiment.

FIG. 1 illustrates an automated planning system 200 that can be implemented, in accordance with a preferred embodiment. It can be appreciated that automated planning system 200 may be implemented in the context of, for example, a data-processing apparatus and/or system.

As depicted in FIG. 1, an automated planner 5 receives as input, a set of predicate definitions 10 which can be utilized to describe the "state of the world". The automated planner 5 can also receive a set of operator definitions 20 that are capable of modifying the "state of the world". The automated planner 5 can also receive as input, an initial-state 30 of the world defined by the initial facts (e.g., grounded predicates) in the system 200 and a description of the desired properties of a goal-state 40. Properties of a goal-state 40 can include a description of the physical properties of a finished product, required processing steps (e.g. Imposition, Printing, Format Conversion, etc.), required resources (e.g. required press-sheet size), and required devices. Given such inputs, the automated planner 5 can then determine a sequence of actions (i.e., a workflow plan 50) that lead from the initial-state 30 to the goal-state 40.

In the automated planning system 200 illustrated in FIG. 1, the set of predicate definitions 10 and the set of operator definitions 20 are products of modeling the domain for which automated planning will occur and are known as the domain model. Domain modeling can be performed in a planning language such as Planning Domain Definition Language (PDDL). These definitions 10 and 20 represent what is known about the domain and cannot be automatically generated in a domain independent way. The initial predicate definitions 10 and operator definitions 20 are arrived at as a result of knowledge engineering and domain modeling and are reusable across arbitrary print shops. As such the predicate and operator definitions 10 and 20 are known a priori to the automated planning system 200 at the time plan generation occurs. The initial-state 30 and the properties of the goal-state 40, however, can be automatically generated since the domain model is already well known.

Figure 2:
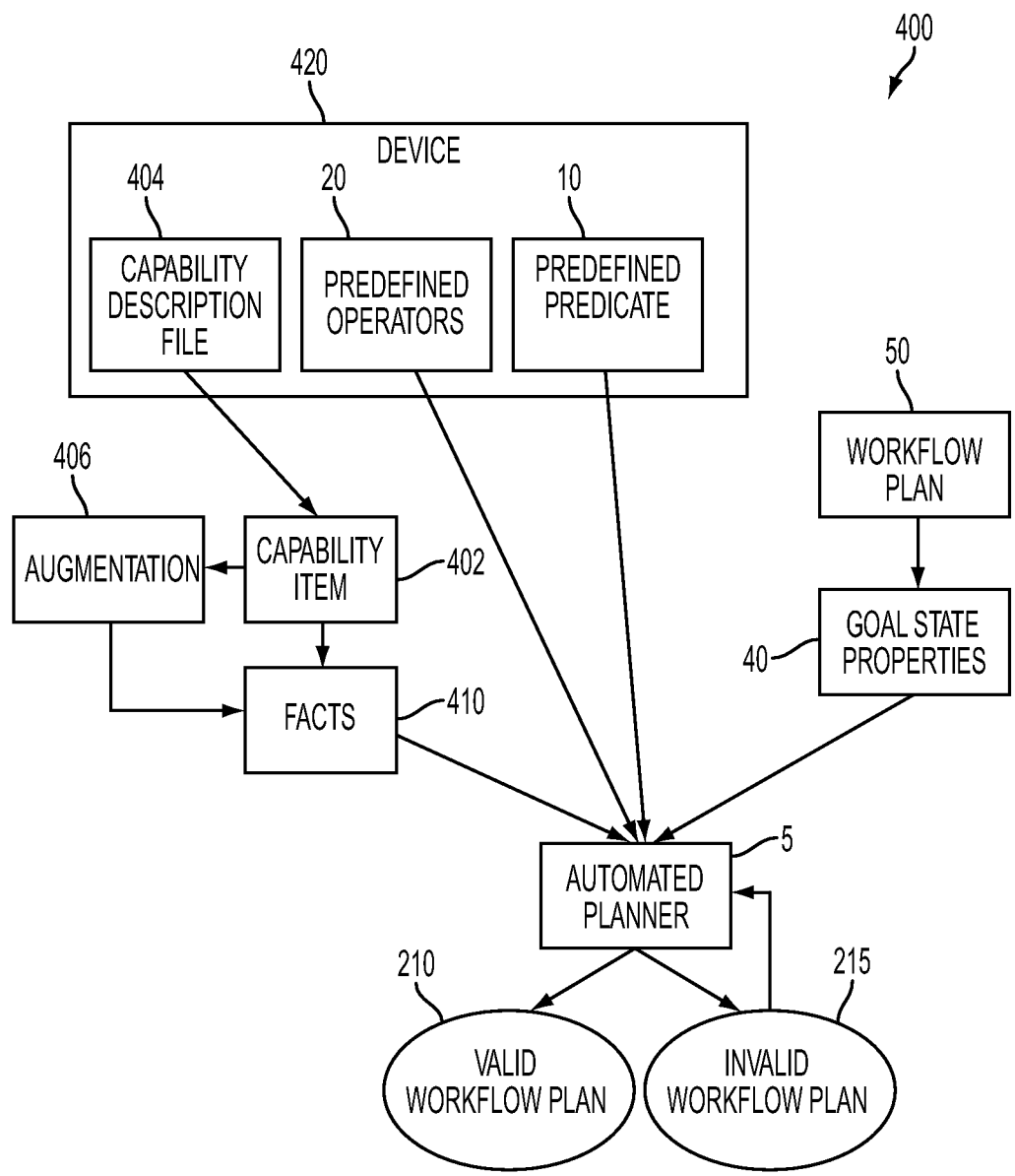
FIG. 2 illustrates a method for automatically validating a workflow plan using an automated planning system in accordance with a preferred embodiment.

FIG. 2 illustrates a method 400 for automatically validating a workflow plan using the automated planning system 200 depicted in FIG. 1, in accordance with a preferred embodiment. Note that in FIGS. 1-2, identical or similar parts or elements are indicated by identical reference numerals. Thus, for example, the automated planner 5 depicted in FIG. 2 represents the same device/component illustrated in FIG. 1. It should be noted that the term "plan validation", as used to describe the present invention, is used in a non-traditional sense to cover not only the verification, but also the synthesis aspect of planning. It is a feature of the present invention that the plan to be validated does not have to be a complete plan that prescribes each and every action in the plan to reach a goal state. It can be a partial plan that only specifies a subset of the actions in the final plan. Furthermore, the order in which these actions appear in the final plan may not be specified in the partial plan, thereby giving the planner enough freedom to synthesis the best plan that meets various constraints. Thus, in the terminology of the disclosed embodiments, "plan validation" covers a continuous spectrum from pure plan validation to pure plan synthesis. Thus, in extreme cases where very little is specified, the automated planner is capable of performing plan synthesis in addition to plan validation.

Initially, each individual device capability/constraint of interest (i.e., capability item 402) is read from the capability description file 404. If applicable, the capability item 402 is augmented with information available from sources outside the capability description file 404. To support both functions of the automated planning system 200, the domain description files need to be augmented by meta-level information that is relevant to plan validation. For example, when a print action is taken, not only the physical effects of a print action need to be modeled, but also that a certain printer was used to print a workflow job needs to be tracked in the "meta state" of the world, because such information may be required later to validate a plan that prefers to use certain printers. Therefore, one aspect of the current invention is that it blurs the boundary between plan validation and synthesis, giving users more flexibility to express their preferences without having to specify all of the details. This allows more productive (and often more pleasant) user-planner interactions in which the user describes the skeleton of a plan and the planner fills in the details for the user.

Further shown in FIG. 2, the potentially augmented capability item 402 is then transformed into one or more facts 410 for use in the automated planning system 200. Based on the type of device 420 (e.g., printer, binder, etc) described by the capability description file 404, one or more predicate definitions and operators 10 and 20 are added to the automated planner 5 from the pre-defined set of a priori known operators and predicate definitions 10 and 20.

Additional facts, predicates and operators may be added to the knowledge base and/or may be used while transforming the capability item into facts 410. Augmenting the capability item (406) may be necessary when the capability description file 404 inadequately describes the capabilities of the device 420 or service, or when information about the relationships between devices and services is not available in the capability description file 404.

Potential sources of additional information are: MIB information obtained using SNMP that describes the current state of the device; a priori or site specific operators that describe known effects a device has on a workflow plan as a result of execution of the device (e.g., a rule may describe that Imposition devices double the width of the image size when performing Booklet-Signature imposition); a priori or site specific operators that describe known constraints of a device that are not captured in the capability description file (e.g., a rule describing that no binding can have been applied prior to use of a Saddle Stitching device); a priori or site specific preferences (e.g., a print shop may decide to make a particular device available or unavailable for use during certain times); as devices and services are added, removed or become unavailable, and/or have their configuration changed, the delta between the capability items and the facts in the automated planning system is determined and the facts in the automated planning system are updated accordingly.

As depicted in FIG. 2, the automated planner 5 utilizes as input, the facts 410, the predicated definitions and operators 10 and 20, and the goal state properties 40 in order to validate the workflow plan 50 as executable or not. Where a workflow plan is found invalid or non-executable, the automated planner 5 searches for an alternative workflow plan to achieve the goal state properties 40. Note that as indicated in FIG. 2, the operation of validating a workflow plan is indicated by block 210 and the operation of invalidating the workflow plan is generally represented by block 215.

Figure 3:
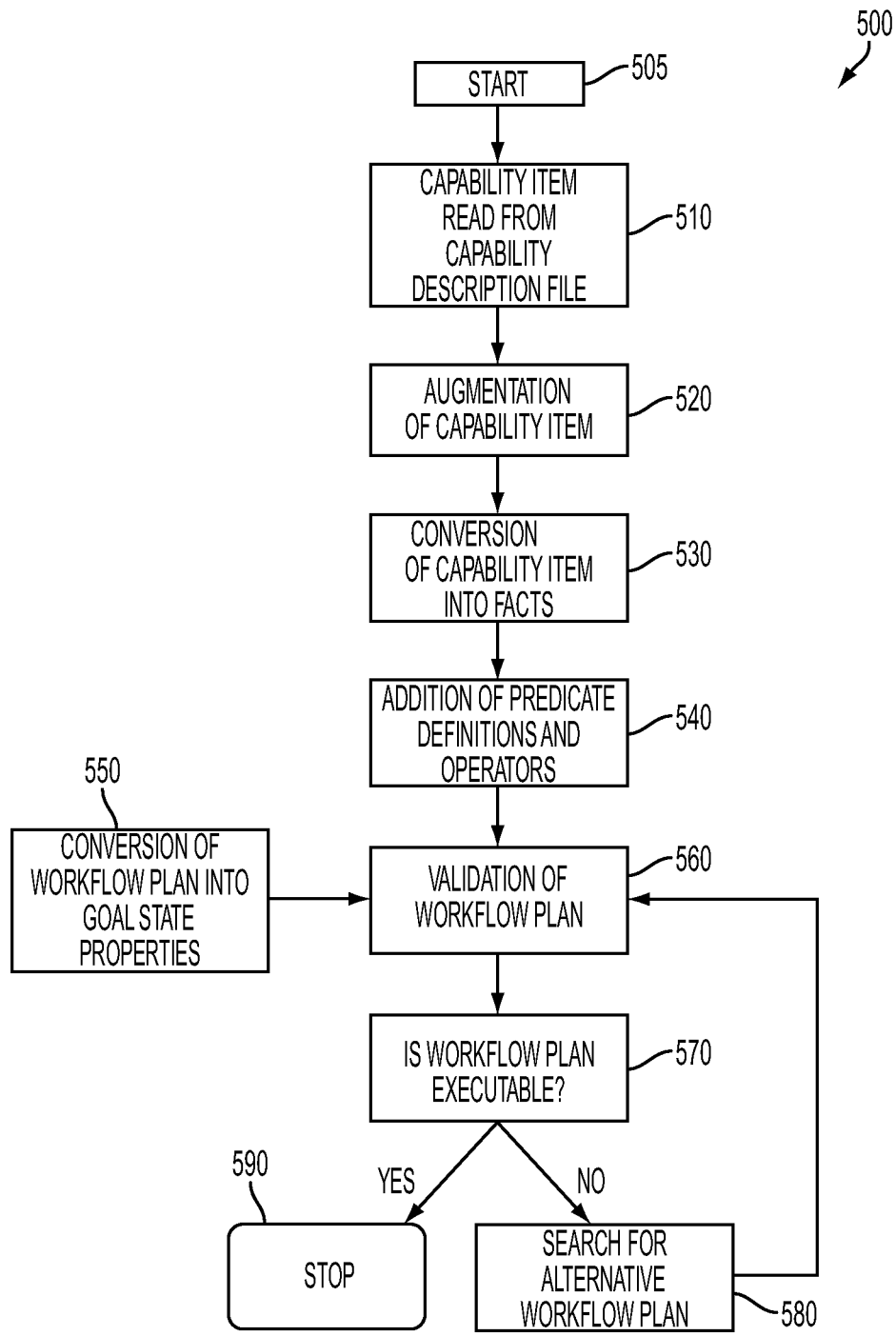
FIG. 3 illustrates a detailed flow chart of operations illustrating logical operational steps of the method for automatically validating a workflow plan using the automated planning system that can be implemented in accordance with a preferred embodiment.

FIG. 3 illustrates a detailed flow chart of operations illustrating logical operational steps of a method 500 for automatically validating a workflow plan utilizing the automated planning system 200 depicted in FIG. 1, in accordance with a preferred embodiment. The method 500 can be implemented in the context of a computer-usable medium that contains a program product.

Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the embodiments may be implemented by a system having means in the form of hardware, software, or a combination of software and hardware as described herein or their equivalent. System 200 can also be implemented in the context of such a system having hardware, software, etc. Thus, the method 500 and/or system 200 described herein can be deployed as process software in the context of a computer system and/or data-processing system such as, for example, a server, computer, network of servers, computers, etc.

The process of method 500 begins, as indicated at block 505. Initially, each individual device capability/constraint of interest (i.e., capability item 402) can be read from the capability description file 404, as depicted in block 510. If applicable, the capability item 402 can be augmented with information available from sources outside the capability description file 404, as depicted in block 520. The operation illustrated thereafter at block 530 indicates that the potentially augmented capability item 402 can then be transformed into one or more facts 410 for use in the automated planning system 200. Next, additional facts, predicates and operators may be added to the knowledge base, and/or may be utilized, while transforming the capability item into facts 410, as shown in block 540. Additionally, as depicted in block 550, a workflow plan 50 is converted into goal state properties 40. The automated planner 5 then utilizes these facts 410 and goal state properties 40 as input for validating the workflow plan 50, as depicted in block 560. A determination as to whether the workflow plan 50 is valid can then be made, as described in block 570. If the workflow plan 50 is found to executable, no further action by the automated planner is needed. If the workflow plan 50 is found invalid, the automated planner searches for an alternative executable workflow plan 50 that will produce the desired goal state properties 40, as depicted in block 580. The process of method 500 can then terminate, as indicated at block 590, following processing of the operation depicted at block 570.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system/apparatus including, but not limited to, personal computers, servers, workstations, network computers, main frame computers, routers, switches, Personal Digital Assistants (PDA's), telephones, and any other system capable of processing, transmitting, receiving, capturing and/or storing data.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A non-transitory computer-readable medium having computer-executable instructions for performing steps to synthesize and validate a workflow plan, comprising:
   converting capability descriptions for each of a plurality of devices into individual capability items for each of said devices;
   augmenting said capability items with additional information external to said capability descriptions;
   receiving domain dependent predicate definitions and domain dependent operator definitions based on each of said devices, wherein said operator definitions are capable of modifying said predicate definitions;
   converting a partial workflow plan into properties of a goal-state, wherein said partial workflow plan lacks at least one of a required processing step, a required resource description or required device description and wherein said goal-state includes physical properties of a finished product;
   validating said partial workflow plan utilizing said predicate definitions, operator definitions, initial facts and said properties of a goal-state; and
   upon determining that said partial workflow plan is valid, synthesizing and validating a complete workflow plan utilizing said augmented capability items, predicate definitions, operator definitions, and said properties of goal-state.

2. The computer-readable medium of claim 1 further comprising generating an alternative executable workflow plan if said partial workflow plan is determined to be invalid.

3. The computer-readable medium of claim 1 wherein said additional information comprises MIB information obtained using SNMP that describes the current state of each of said devices.

4. The computer-readable medium of claim 1 wherein said predicate definitions and operator definitions are obtained utilizing domain modeling.

5. The computer-readable medium of claim 4 wherein said domain modeling utilizes a Planning Domain Definition Language.

6. A system for automated synthesizing and validation of a workflow plan, comprising:
   a processor;
   a data bus coupled to said processor;
   a non-transitory computer-usable medium embodying computer code, said computer-usable medium being coupled to said data bus, said computer program code comprising instructions executable by said processor and configured for:
   converting capability descriptions for each of a plurality of devices into individual capability items for each of said devices;
   augmenting said capability items with additional information external to said capability descriptions;
   receiving domain dependent predicate definitions and domain dependent operator definitions based on each of said devices, wherein said operator definitions are capable of modifying said predicate definitions;
   converting a partial workflow plan into properties of a goal-state, wherein said partial workflow plan lacks at least one of a required processing step, a required resource description or required device description and wherein said goal-state includes physical properties of a finished product;
   validating said partial workflow plan utilizing said predicate definitions, operator definitions, initial facts and said properties of a goal-state; and
   upon determining that said partial workflow plan is valid, synthesizing and validating a complete workflow plan utilizing said augmented capability items, predicate definitions, operator definitions, and said properties of goal-state.

7. The system of claim 6 wherein said instructions are further configured for generating an alternative executable workflow plan if said partial workflow plan is determined to be invalid.

8. The system of claim 6 wherein said additional information comprises MIB information obtained using SNMP that describes the current state of each of said devices.

9. The system of claim 6 wherein said instructions are further configured for predetermining said predicate definitions and operator definitions utilizing domain modeling.

10. The system of claim 9 wherein said domain modeling utilizes a Planning Domain Definition Language.

11. A non-transitory computer-usable medium for automated synthesis and validation of a workflow plan, said computer-usable medium embodying computer program code, said computer program code comprising computer executable instructions configured for:
   converting capability descriptions for each of a plurality of devices into individual capability items for each of said devices;
   augmenting said capability items with additional information external to said capability descriptions;
   receiving domain dependent predicate definitions and domain dependent operator definitions based on each of said devices, wherein said operator definitions are capable of modifying said predicate definitions;
   converting a partial workflow plan into properties of a goal-state, wherein said partial workflow plan lacks at least one of a required processing step, a required resource description or required device description and wherein said goal-state includes physical properties of a finished product;
   validating said partial workflow plan utilizing said predicate definitions, operator definitions, initial facts and said properties of a goal-state; and
   upon determining that said partial workflow plan is valid, synthesizing and validating a complete workflow plan utilizing said augmented capability items, predicate definitions, operator definitions, and said properties of goal-state.

12. The computer-usable medium of claim 11 wherein said embodied computer program code further comprises computer executable instructions configured for generating an alternative executable workflow plan if said partial workflow plan is determined to be invalid.

* * * * *